US010986085B2

United States Patent
Ou et al.

(10) Patent No.: US 10,986,085 B2
(45) Date of Patent: Apr. 20, 2021

(54) SUBSCRIBER IDENTITY MANAGEMENT

(71) Applicant: Citrix Systems, Inc., Fort Lauderdale, FL (US)

(72) Inventors: Yuran Ou, Nanjing (CN); Bo Zang, Nanjing (CN); Sai Xu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/265,103

(22) Filed: Feb. 1, 2019

(65) Prior Publication Data

US 2020/0220858 A1    Jul. 9, 2020

Related U.S. Application Data

(63) Continuation of application No. PCT/CN2019/070564, filed on Jan. 7, 2019.

(51) Int. Cl.
*H04L 29/06* (2006.01)

(52) U.S. Cl.
CPC ........ *H04L 63/083* (2013.01); *H04L 63/0876* (2013.01)

(58) Field of Classification Search
CPC .. H04L 63/083; H04L 63/0876; H04W 12/06; H04W 12/0051
See application file for complete search history.

(56) References Cited

U.S. PATENT DOCUMENTS

| | | | |
|---|---|---|---|
| 6,145,085 A * | 11/2000 | Tran | G06F 21/31 726/5 |
| 8,369,823 B2 | 2/2013 | Chen | |
| 2007/0189532 A1* | 8/2007 | Onozu | G06Q 20/341 380/247 |

(Continued)

FOREIGN PATENT DOCUMENTS

| | | |
|---|---|---|
| CN | 101232638 A | 7/2008 |
| CN | 101309518 A | 11/2008 |

(Continued)

OTHER PUBLICATIONS

"What is the difference between IMEI and serial numbers?," https://www.quora.com/What-is-the-difference-between-IMEI-and-serial-numbers, website visited Jan. 23, 2019, pp. 1-5.

(Continued)

*Primary Examiner* — J. Brant Murphy
(74) *Attorney, Agent, or Firm* — Banner & Witcoff, Ltd.

(57) ABSTRACT

Methods and systems for management of subscriber identities associated with user devices are described herein. The user device may enroll the user device to a server and lock a subscriber identity associated with the device by setting a password on the subscriber identity. If a credential entered by a user is verified, the subscriber identity associated with the device may be unlocked. Alternatively, the user device may retrieve one or more identities associated with the user, the user device and/or the subscriber identity. A server may register the one or more identities with a database. If the user device sends a request to connect to the network, the server may verify the one or more identities retrieved by the user device to determine whether to grant access from the user device to the network.

20 Claims, 10 Drawing Sheets

(56) References Cited

U.S. PATENT DOCUMENTS

| | | | |
|---|---|---|---|
| 2009/0235333 A1* | 9/2009 | Ong | G06F 21/604 726/4 |
| 2009/0279682 A1* | 11/2009 | Strandell | H04L 63/18 379/201.02 |
| 2011/0125807 A1* | 5/2011 | Bland | H04L 29/12188 707/803 |
| 2011/0230166 A1* | 9/2011 | Hu | H04W 12/06 455/411 |
| 2012/0058743 A1* | 3/2012 | Chen | H04L 63/102 455/411 |
| 2012/0244839 A1* | 9/2012 | Shen | H04L 63/083 455/411 |
| 2013/0036223 A1* | 2/2013 | Du | H04L 63/0876 709/225 |
| 2013/0303123 A1* | 11/2013 | Nousiainen | H04L 63/0853 455/411 |
| 2014/0057597 A1* | 2/2014 | Velusamy | H04W 12/08 455/411 |
| 2014/0281562 A1* | 9/2014 | Kespohl | G06F 21/31 713/184 |
| 2016/0165442 A1* | 6/2016 | Shi | H04W 12/06 726/4 |
| 2017/0331812 A1* | 11/2017 | Lander | H04L 63/083 |
| 2019/0007840 A1* | 1/2019 | Velusamy | H04W 12/1206 |
| 2019/0053051 A1* | 2/2019 | Yu | H04L 9/0825 |

FOREIGN PATENT DOCUMENTS

| | | |
|---|---|---|
| CN | 102088691 A | 6/2011 |
| CN | 102595401 A | 7/2012 |
| CN | 103079187 A | 5/2013 |
| CN | 107948390 A | 4/2018 |
| CN | 108769981 A | 11/2018 |

OTHER PUBLICATIONS

Christian de Looper, "What is an eSIM? Here's everything you need to know," https://www.digitaltrends.com/mobile/esim-explainer/, website visited Jan. 23, 2019, pp. 1-11.

Dan Grabham, "What is an eSIM and what does it mean for your new iPhone, iPad or Pixel?," https://www.pocket-lint.com/phones/news/134640-what-is-an-esim-and-how-will-it-change-connected-devices-for-the-better, website visited Jan. 23, 2019, pp. 1-15.

"Subscriber identity module," https://en.wikipedia.org/wiki/Subscriber_identity_module, website visited Jan. 23, 2019, pp. 1-19.

"Personal identification number," https://en.wikipedia.org/wiki/Personal_identification_number, website visited Jan. 23, 2019, pp. 1-5.

"International mobile subscriber identity," https://en.wikipedia.org/wiki/International_mobile_subscriber_identity, website visited Jan. 23, 2019, pp. 1-5.

"International Mobile Equipment Identity," https://en.wikipedia.org/wiki/International_Mobile_Equipment_Identity, website visited Jan. 23, 2019, pp. 1-6.

"Application programming interface," https://en.wikipedia.org/wiki/Application_programming_interface, website visited Jan. 23, 2019, pp. 1-10.

* cited by examiner

SUBSCRIBER IDENTITY MANAGEMENT

CROSS-REFERENCE TO RELATED APPLICATIONS

This application is a continuation of pending PCT International Application No. PCT/CN2019/070564, filed Jan. 7, 2019, and entitled "Subscriber Identity Management," which is herein incorporated by reference in its entirety.

FIELD

Aspects described herein generally relate to telecommunications, smartphones, mobile cellular networks, wireless networks, and subscriber identity management.

BACKGROUND

A subscriber identity module (SIM), such as a SIM card, may store sensitive private information that identifies the SIM to a specific mobile network, and the SIM may be used to give users access to the mobile network. The SIM may be used to identify and authenticate users of mobile devices or computers. However, existing SIMs do not provide effective methods of protecting user information from unauthorized entities. Existing SIMs also could be exposed to potential identity thefts if the SIMs are lost or stolen.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

If a subscriber identity (e.g., a SIM) associated with an original user is lost or hacked, the subscriber identity could be used in another device by an unauthorized user. Based on the illegally obtained SIM, the unauthorized user may, for example, extract security codes, messages, or login information to software associated with the original user. The unauthorized user may use carrier billing information to steal money from the original user. The unauthorized user may send fake data to other parties by disguising the unauthorized user as the original user. Example systems, processes, or methods of protecting the subscriber identity from unauthorized uses are described herein.

To overcome limitations in the prior art described above, and to overcome other limitations that will be apparent upon reading and understanding the present specification, aspects described herein are directed towards a method of sending, by a user device and to a server, a request to enroll the user device to the server. The user device may be associated with a subscriber identity. The subscriber identity may comprise a SIM. The SIM may be an integrated circuit used in mobile devices, and may be used to identify or authenticate subscribers on mobile phones or computers. The SIM may be transferable between different mobile devices. The SIM may store network-specific information used to authenticate or identify subscribers on a network. The user device may send, to the server, a request for the server to generate a password for the subscriber identity. The user device may receive, from the server, the password generated by the server. Based on the password, the user device may lock the subscriber identity. For example, the user device may call an application programming interface (API) or a protocol to set the password on the subscriber identity. The user device may store the password in a database of the user device. The password may comprise a personal identification number (PIN), and the PIN may be associated with a user of the user device.

The user may enter a local password associated with a management software of the user device to enroll the user device to the server and connect to the network. The user device may receive input of a local password from the user, after the subscriber identity is locked. The user may enter the local password to log in the management software, enroll the user device to the server, and connect to the network. Based on a determination that the local password is verified, the user device may retrieve, from the database, the password previously generated by the server. The user device may connect, via the subscriber identity, to the network. If the user enters a local password associated with the management software to connect to the network, the management software may verify the local password. The user may try to unlock the management software by entering the password and connect to the network. Because the management software is protected by the local password, unauthorized users may not connect to the network. The user device may store the password in a key store located in the database. The key store may be protected by a security measure such as, e.g., a password, a PIN, a certificate, etc. Even if the user device is lost or stolen, unauthorized users cannot access private information stored by the database. The key store may be configured to store cryptographic keys or certificates. The user may securely store private information in the key store of the user device.

One or more aspects of the disclosure may also provide a method of receiving, by a server and from a user device, a request to access a network. The request may comprise a first identity associated with the user device. The first identity may indicate one or more product specifications of the user device. The request may comprise the second identity associated with a subscriber identity of the user device. The second identity may indicate one or more cellular network subscription information. The server may retrieve, from a database associated with the server, one or more identities previously registered with the database. The server may determine whether the first identity and the second identity correspond to the one or more identities. Based on the determining, the server may connect to the user device via the network. The first identity may comprise a model, a manufacturer, or a serial number. The receiving the request to access the network may be based on retrieving, by the user device and from an operating system associated with the user device, an International Mobile Equipment Identity (IMEI). The second identity may comprise a country code, a network code, or a subscription identification number. The receiving the request to access the network may be based on retrieving, by the user device and from the subscriber identity, an International Mobile Subscriber Identity (IMSI). The receiving the request to access the network may be based on determining, by the user device, that input of a local password associated with a management software of the user device has been verified. The server may receive, from the user device, the one or more identities before the receiving the request to access the network. The server may register the one or more identities with the database associated with the server. The registering the one or more identities with the database may comprise storing the one or more identities in a key store configured to store cryptographic keys or certificates.

One or more aspects of the disclosure may also provide a method of receiving, by a server and from a user device, a request to access a network. The user device may be associated with a subscriber identity. The server may send, to the user device, a request for one or more identities associated with the user device. The server may receive, from the user device, a first identity associated with the user device. The server may receive, from the user device, a second identity associated with a user network identity. The server may retrieve, from a database associated with the server, identities that have been registered to the database. Based on a determination, by the server, that the first identity and the second identity correspond to the registered identities, the server may send, to the user device, a confirmation for accessing the network. The first identity may comprise an international mobile equipment identity. The second identity may comprise an international mobile subscriber identity. The receiving the request to access the network may be based on a determination that a local password associated with the user device has been verified. The server may receive, from the user device, the identities. The server may register the identities to the database. The server may store the identities in a key store configured to store cryptographic keys or certificates. Before retrieving the identities that have been registered to the database, the server may determine that one or more of the identities have been registered to the database.

One or more aspects of the disclosure may also provide one or more non-transitory computer readable media storing computer readable instructions that, when executed, cause a management software associated with a user device to send, to a server, a request to enroll the user device. The computer readable instructions may cause the management software to send, to the server, a request for the server to generate a password for the subscriber identity. The computer readable instructions may cause the management software to receive, from the server, the password generated by the server. Based on the password, the computer readable instructions may cause the management software to lock the subscriber identity. The computer readable instructions may cause the management software to store the password in a database of the user device. The computer readable instructions may cause the management software to call an application program interface or a protocol. The computer readable instructions may cause the management software to set, via the application program interface or the protocol, the password on the subscriber identity. The computer readable instructions may cause the management software to receive input of a local password after the subscriber identity is locked. Based on a determination that the local password is verified, the computer readable instructions may cause the management software to send, to the database, a request for the password. The computer readable instructions may cause the management software to receive, from the database, the password. Based on the password received from the database, the computer readable instructions may cause the management software to unlock the subscriber identity. The computer readable instructions may cause the management software to cause, via the subscriber identity, the user device to connect to a network. The computer readable instructions may cause the management software to verify the local password. The computer readable instructions may cause the management software to store the password in a key store. The key store may be located within the database. The key store may be configured to store cryptographic keys or certificates.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards enrolling a user device associated with a subscriber identity and locking and unlocking the subscriber identity associated with the user device. In the user device, management software may send a request to enroll the user device to the server, and lock the subscriber identity by setting a password on the subscriber identity. The management software may allow the server to control, secure and enforce policies on the user device. If a local password associated with the management software is verified, the management software may unlock the subscriber identity, which has been locked by a password generated by the server. The local password may be enforced by the management software for security. Private information stored in the subscriber identity may be protected by the password set by the management software. As a result, users may be protected against potential unauthorized use of their private information, even if their devices are lost or hacked. The management software is locked by the local password, and the subscriber identity is locked by the password generated by the server. Without knowledge of the local password, unauthorized users may not extract security codes, private messages, login information for software, or carrier billing information from the subscriber identity. Example methods of protecting private information stored in the subscriber identity will be described in further detail in this disclosure.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled" and similar terms, is meant to include both direct and indirect mounting, connecting, coupling, positioning and engaging.

Computing Architecture

Figure 1:
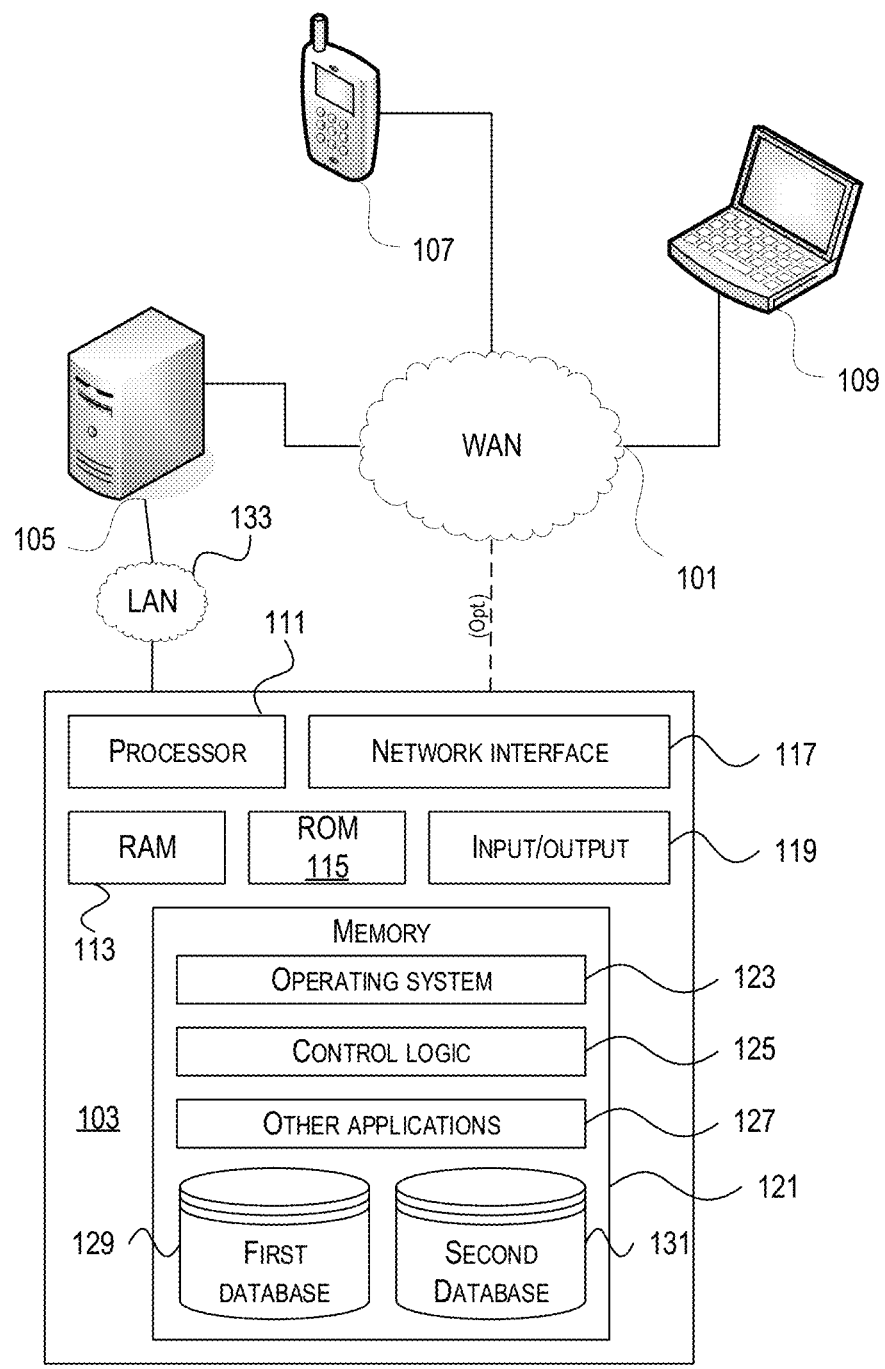
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
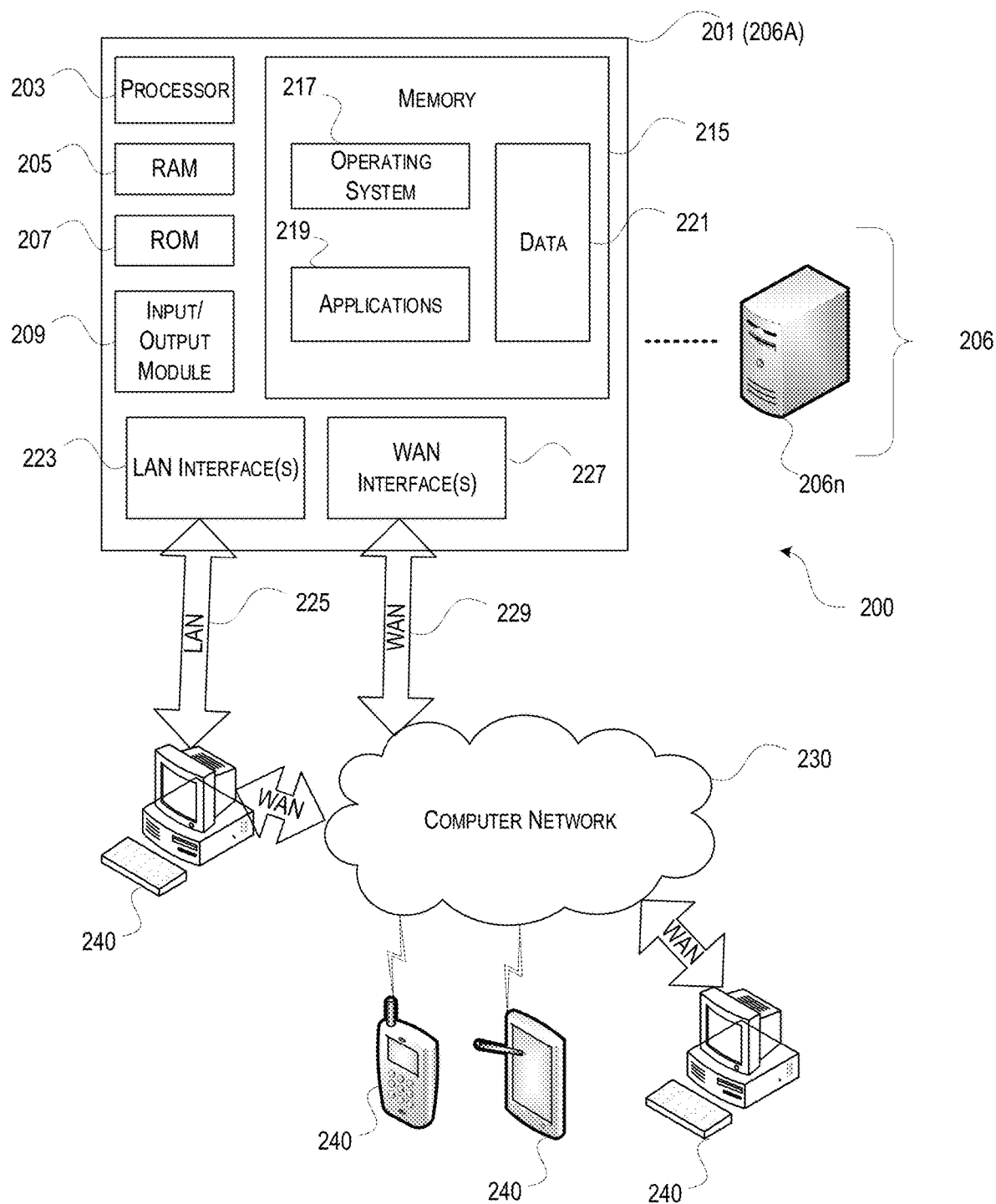
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown). First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Subscriber Identity Management

Figure 3:
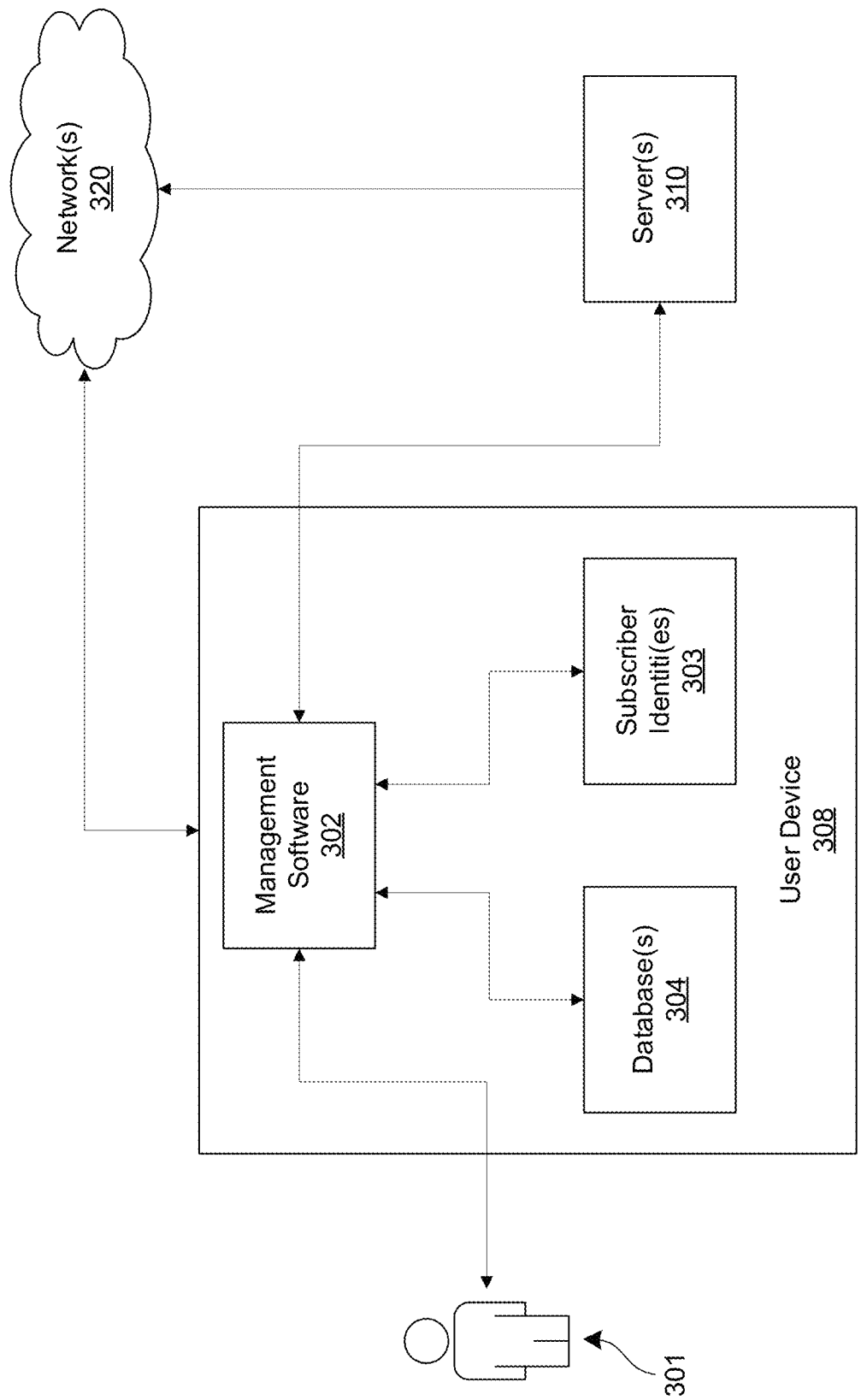
FIG. 3 depicts an illustrative operating environment of subscriber identity management system.

FIG. 3 depicts an illustrative operating environment of subscriber identity management. An illustrative operating environment may comprise a user 301, a user device 308, management software 302 associated with the user device 308, one or more subscriber identities 303, a database 304, one or more servers 310 (e.g., a mobile device management server), and one or more networks 320 (e.g., a mobile cellular network). The user 301 may make phone calls, use mobile data, send short message service (SMS) messages, connect to mobile internet services, etc. The subscriber identity 303 may be inserted or otherwise associated with the user device 308, and the user device 308 may connect to the network(s) 320, such as via the server 310 or directly with the network(s) 320.

The subscriber identity 303 may comprise a SIM, which may comprise an integrated circuit chip and/or data that stores account information used to identify or authenticate subscribers (e.g., the user 301) to the network(s) 320. Examples of a SIM include a mini SIM, a micro SIM, a nano SIM, an embedded SIM (eSIM), a full-size SIM, etc. SIMs may be transferable between different mobile devices. eSIMs may be provisioned remotely, and the user 301 may add or remove network operators without physically swapping a SIM from the device. SIMs may be used on GSM (Global System for Mobile communications) devices, LTE (Long-Term Evolution) capable devices, CDMA (Code-Division Multiple Access) devices, 5G (fifth generation) devices, etc.

The subscriber identity 303 may store network-specific information such as, an ICCID (Integrated Circuit Card Identifier), an IMSI (International Mobile Subscriber Identity), an Authentication Key ($K_i$), a Local Area Identity (LAI), an Operator-Specific Emergency Number, etc. The subscriber identity 303 may also store other carrier-specific data such as a Short Message Service Center (SMSC) number, a Service Provider Name (SPN), a Service Dialing Number (SDN), Advice-Of-Charge parameters and Value Added Service (VAS) applications, etc.

The user device 308 may correspond to the client computers 107 or 109 of FIG. 1 or the computing device 201 or the mobile terminals 240 of FIG. 2. For example, the user device 308 may comprise mobile phones or computers, smartphones, tablet computers, hand-held or laptop devices, personal digital assistants (PDAs), notebooks, network personal computers (PCs), satellite phones, smart watches, cameras, etc.

The management software 302 may correspond to one or more of the operating system software 123, the control logic 125, or the other applications 127 of FIG. 1 or the operating system 217 or the application programs 219 of FIG. 2. The management software 302 may comprise a mobile device management software running on the user device 308. The management software 302 may provide the user device 308 access to the server 310 and/or the network 320.

The management software 302 may be used to enroll the user device 308 to the server 310 and/or the network 320. If the user device 308 is enrolled to the server 310 and/or the network 320, the management software 302 may communicate with the server 301 an/or the network 320 to obtain access to the network 320 from the user device 308. The server 310 and/or the network 320 may also apply enrollment policies via the management software 302. Server or network administrators may select which user devices can enroll to the network 320. The management software 302 may notify the user 301 of a result of the enrollment of the user device 308.

The management software 302 may provide sign-on capabilities and the enforcement of device and/or app-level security policies. For example, if the user 301 turns on the user device 308, the management software 302 may request the user 301 to enter a local password associated with the management software 302. If the user 301 enters a wrong password, the management software 302 may not send a request for enrollment. If the user 301 enters a correct password, the management software 302 may send a request for enrollment to the server 310.

The management software 302 may be authorized to access or communicate with the subscriber entity 303 and/or the database 304. The management software 302 may be, e.g., security software that monitors, manages and secures the subscriber entity 303 and/or the database 304. The management software 302 may be authorized to read, write, erase or retrieve information stored in the database 304. The management software 302 may be authorized to retrieve subscriber network information from the subscriber identity 303.

The database 304 may correspond to the RAM 113, the ROM 115, the memory 121 or the databases 129 or 131 of FIG. 1 or the RAM 205, the ROM 207, the memory 215, or the associated database 221 of FIG. 2. The database 304 may comprise a key store or key chain to securely store cryptographic keys or certificates. The database 304 may securely receive and store a password associated with the management software 302. The management software 302 may be authorized to retrieve the password from the database 304. The password may comprise a personal identification number (PIN), a random number generated by a server, a certificate, etc. Though not shown in FIG. 3, the database 304 may be associated with the server 310 or located in the server 310. The database 304 may also be associated with the network 320 or located in the network 320.

The server 310 may correspond to the data server 103 or the web server 105 of FIG. 1 or the computing device 201 or the server 206 of FIG. 2. The server 310 may comprise a mobile device management server or a mobile application management server. The server 310 may allow businesses to manage employee mobile devices (e.g., the user device 308) and/or mobile applications. The server 310 may be able to track, lock, or wipe mobile devices (e.g., the user device 308), in addition to securing access to the network 320. As previously described, the user device 308 may be connected to the network 320, via the server 310. Or, the user device 308 may connect directly to the network 320. The server 310 may receive a request to generate a password from the management software 302. The server 310 may generate a password associated with the management software 302. The server 310 may use a random number generator algorithm to generate the password. The server 310 may generate an individual password for each user. The server 310 may send the generated password on the management software 302.

The network 320 may correspond to the WAN 101 or the LAN 133 of FIG. 1 or the WAN 229, the LAN 225, or the network 230 of FIG. 2. The network 320 may comprise a telecommunication network, a wireless carrier network, a mobile cellular network, a computer network, the Internet, a telephone network, etc. The network 320 may comprise a database storing subscriber identities associated with user devices. The database may store a list of authorized or unauthorized user devices. The network 320 may comprise an access control server which controls a request to connect to the network 30. The access control server may verify identities associated with users, user devices and/or subscriber identities and register the identities with a database.

Though not shown in FIG. 3, each of the user device 308 and the server 310 may comprise a computer processor (e.g., the processor 111 or the control logic 125 of FIG. 1 or the processor 203 of FIG. 2) and/or memory (e.g., the RAM 113, the ROM 115, the memory 121 or the databases 129 or 131 of FIG. 1 or the RAM 205, the ROM 207, the memory 215, or the associated database 221 of FIG. 2). Each of the user device 308 and the server 310 may correspond to the data server 103 of FIG. 1 or the computing device 201 of FIG. 2.

Figure 4:
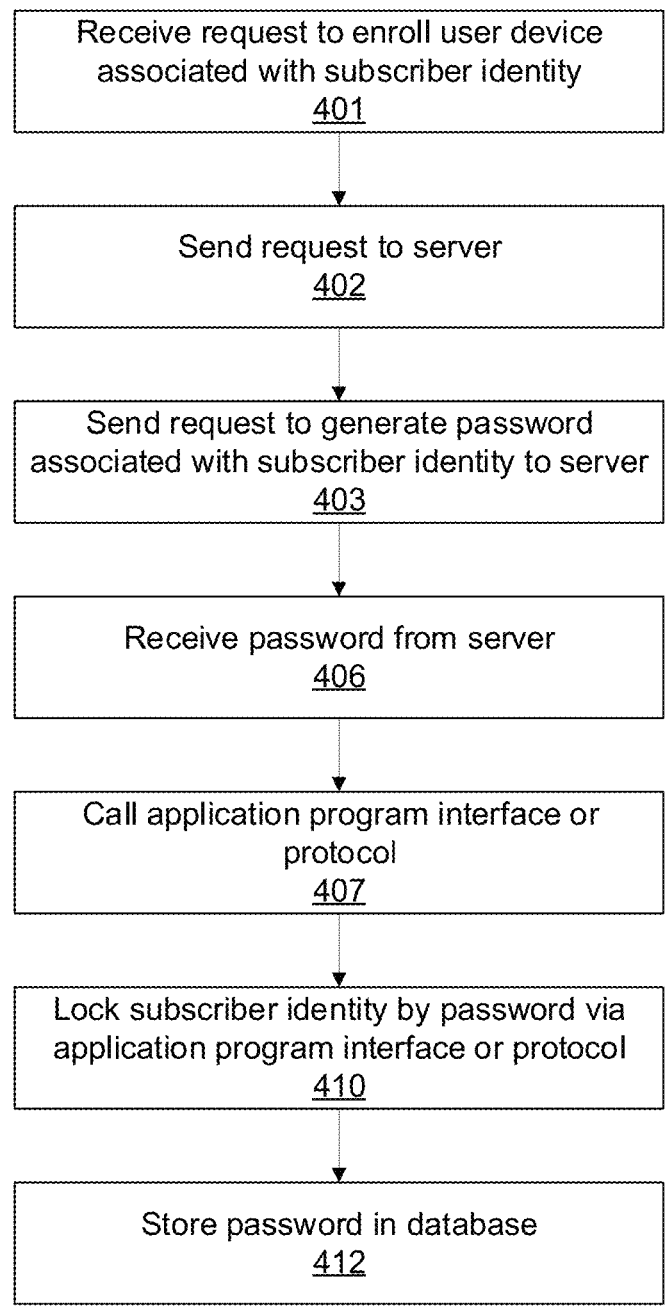
FIG. 4 depicts an illustrative flow chart showing example methods for a management software associated with a user device to enroll the user device and lock a subscriber identity associated with the user device.

FIG. 4 depicts an illustrative flow chart showing example methods for the management software 302 to enroll the user device 308 and lock the subscriber identity 303. In FIG. 4, at step 401, the management software 302 may receive a request to enroll the user device 308. For example, after turning on the user device 308, the user 301 may submit a request to enroll the user device 308 to the management software 302. Or, after the user 301 turns on the user device 308, the management software 302 may automatically generate a request to enroll the user device 308. As previously described, administrators of the server 310 and/or the network 320 may apply one or more security policies, via the management software 302.

As previously described, the management software 302 may provide sign-on capabilities (e.g., requesting the user 301 to enter a local password), by which the user 301 may sign on to the management software 302. Unauthorized users (e.g. hackers, etc.) may not enroll the user device 308 to the server 310 and/or the network 320 using the management software 302. If the user 301 fails to log on to the management software 302, the management software 302 might not accept the request to enroll the user device 308. Alternatively, the request to enroll the user device 308 may be received by the management software 302 without verifying a local password.

At step 402, the management software 302 may send, to the server 310, the request to enroll the user device 308. Based on the request to enroll the user device 308 to the server 310 (e.g. in step 401) from the user 301, the management software 302 may send the request to enroll the user device 308 to the server 310. Alternatively, the management software 302 may combine the request to enroll the user device 308 with a request for the server 310 to generate a password associated with the subscriber identity 303 (to be described, e.g., in step 403).

At step 403, the management software 302 may send, to the server 310, a request for the server 310 to generate a password associated with the subscriber identity 303. The request to generate the password associated with the subscriber identity 303 may be automatically sent to the server 310, e.g., without a request from the user 301. For example, the user 301 might not request to lock the subscriber identity 303, even after the user 301 enters a local password (e.g., at step 401). Even if the user 301 loses the subscriber identity 303, private information within the subscriber identity 303 may be protected because the subscriber identity 303 may be automatically locked using a password generated by the server 310. Example methods of setting a password on the subscriber identity 303 will be described in further detail below. Alternatively, the user 301 may manually set a password associated with the subscriber identity 303, such as using a security setting associated with the user device 308.

At step 406, the management software 302 may receive the password generated by the server 310. At step 407, the management software 302 may call a system application program interface (API) or protocol. For example, the management software 302 may call a system API, such as supplyPin( ) in PhoneInterfaceManager.java in an Android system, and/or may call a security setting protocol (e.g., setting "Enable SIM card lock").

At step 410, the management software 302 may lock the subscriber identity 303 using the password generated by the server 310. The management software 302 may set the password on the subscriber identity 303, via the system API or the security setting protocol called, e.g., in step 407. The management software 302 may use a set of clearly defined methods of communication among various software components. For example, the system API may be a set of programming routines, protocols or tools for setting a password on the subscriber identity 303, such as supplyPin( ) in PhoneInterfaceManager.java in an Android system. The subscriber identity 303 may also be locked without notifying the user 301. As previously explained, the user 301 might not have requested to lock the subscriber identity 303. Alternatively, the user 310 may manually lock the subscriber identity 303 using a security setting associated with the user device 308 (e.g., setting a pin code on an IPHONE by choosing SIM PIN option in phone settings).

At step 412, the management software 302 may store the password set for the subscriber identity 303 in the database 304. The management software 302 may send the password to the database 304. The database 304 may comprise a key store or key chain to securely store cryptographic keys or certificates. An operating system (OS) associated with the user device 308 may put a security measure, such as a local password, on the database 304. As previously discussed, the management software 302 may be authorized to read, write, erase or retrieve information from the database 304.

Figure 5:
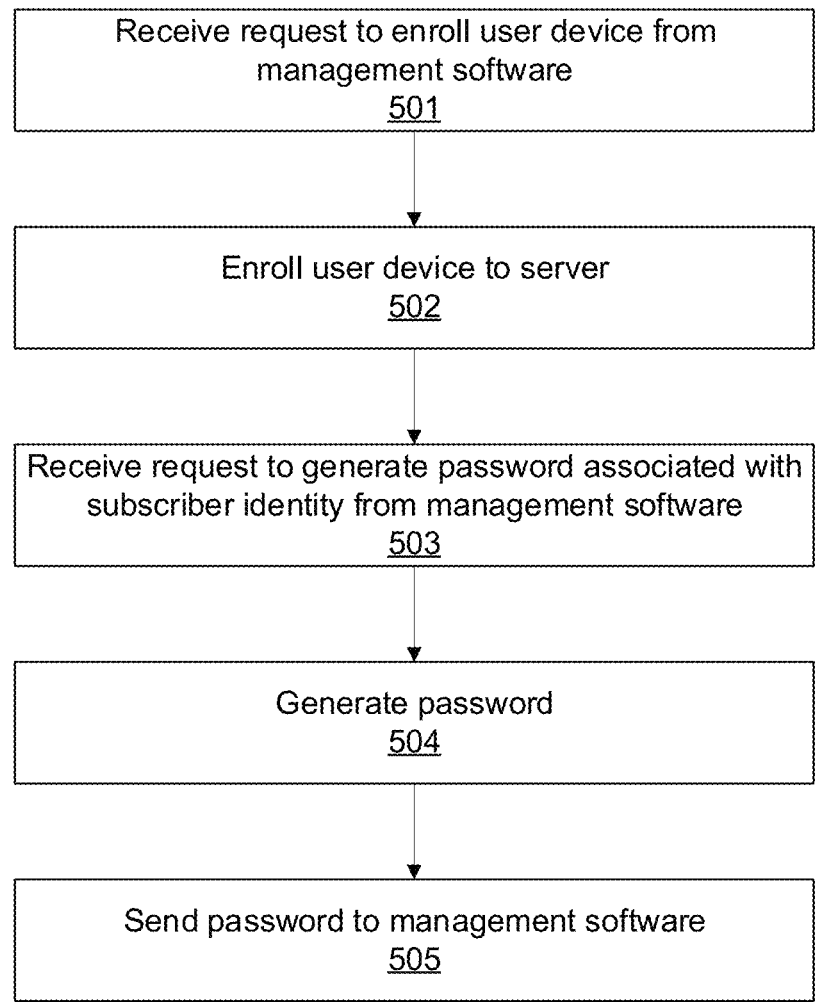
FIG. 5 depicts an illustrative flow chart showing example methods for a server to enroll a user device and lock a subscriber identity associated with the user device.

FIG. 5 depicts an illustrative flow chart showing example methods for the server 310 to enroll the user device 308 and lock the subscriber identity 303. In FIG. 5, at step 501, the server 310 may receive, from the management software 302, a request to enroll the user device 308 to the server 310. As previously described, the request may have been sent from the management software 302, e.g., in step 402 of FIG. 4. At step 502, the server 310 may enroll the user device 308 to the server 310. When the user device 308 is enrolled to the server 310, the user device 308 may send identities associated with the user 301, the user device 308 and/or the subscriber identity 303 to the server 310.

At step 503, the server 310 may receive a request for the server 310 to generate a password associated with the subscriber identity 303. As previously described, the request may have been sent from the management software 302, e.g., in step 403 of FIG. 4. At step 504, the server 310 may generate a password for the subscriber identity 303. The password may comprise, for example, a PIN, a random number generated by a password generator associated with the server 310, and/or any other type of password. The server 310 may generate an individualized password for each of the subscriber identities 303. The server 310 may use a random number generator algorithm to generate a password. At step 505, the server 310 may send the generated password (e.g., in step 504), to the management software 302. As previously described, the management software 302 may receive the password, e.g., in step 406 of FIG. 4.

Figure 6:
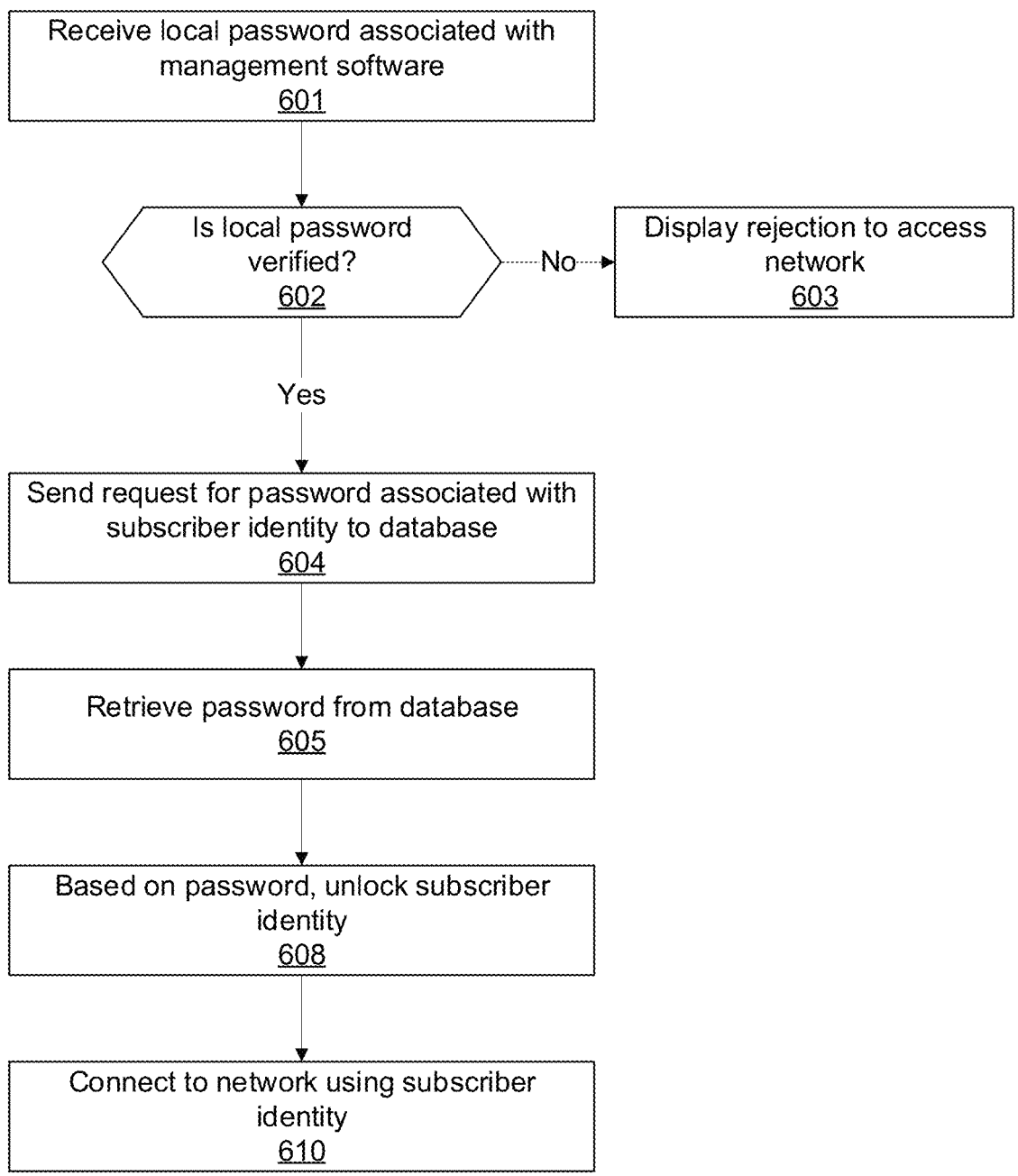
FIG. 6 depicts an illustrative flow chart showing example methods of unlocking a subscriber identity that has been previously locked.

FIG. 6 depicts an illustrative flow chart showing example methods of unlocking the subscriber identity 303 that has been previously locked, e.g. in FIGS. 4 & 5. At step 601, the management software 302 may receive a local password associated with the management software 302. The user 301 may enter the local password into the management software 302. If unauthorized users enter a wrong password, the management software 302 can deny their access to the management software 302, as well as the subscriber identity 303.

At step 602, the management software 302 may verify the local password. The local password may have been set by the user 301, e.g., by using app settings of the user device 308. If the user 301 enters a password, the management software 302 may determine whether the password matches with a previously registered password of the management software 302. If the password is not verified (e.g., step 602: no), at step 603, the management software 302 can deny access to the network 320. In some examples, the management software 302 may also display a notification to the user 301 that indicates denial of access to the network 320. If the local password is verified (e.g., step 602: yes), at step 604, the management software 302 may send a request to retrieve a password associated with the subscriber identity 303 to the database 304. The request for the password associated with the subscriber identity 303 may be automatically sent to the subscriber identity 303, e.g., without involving a request from the user 301.

At step 605, the management software 302 may retrieve the password associated with the subscriber identity 303 from the database 304. The database 304 may retrieve the previously stored password (e.g., stored in step 412 of FIG. 4) and send the password to the management software 302. As previously described, the management software 302 may be authorized to read, write, erase or retrieve information from the database 304. At step 608, the subscriber identity 303 may be unlocked based on the password associated with the subscriber identity 303. As previously described, the management software 302 may have set the password on the subscriber identity 303, e.g., in step 410 of FIG. 4. The subscriber identity 303 may be unlocked if the password previously set by the management software 302 matches the password retrieved from the database 304, e.g., in step 605.

At step 610, the user device 308 may connect to the network 320 using the subscriber identity 303 (e.g., by using the user account information and/or network-specific information stored in the subscriber identity 303). For example, after the subscriber identity 303 is unlocked, the subscriber identity 303 may search for networks to connect to. The subscriber identity 303 may find the network 320, and send identities associated with the subscriber identity 303, such as an IMSI or one or more authentication keys, to the network 320. The network 320 may verify the identities associated with the subscriber identity 303 and authenticate the subscriber identity 303. If the network 320 succeeds in verifying the identities and authenticating the subscriber identity 303, the user device 308 may be connected to the network 320.

Figure 7:
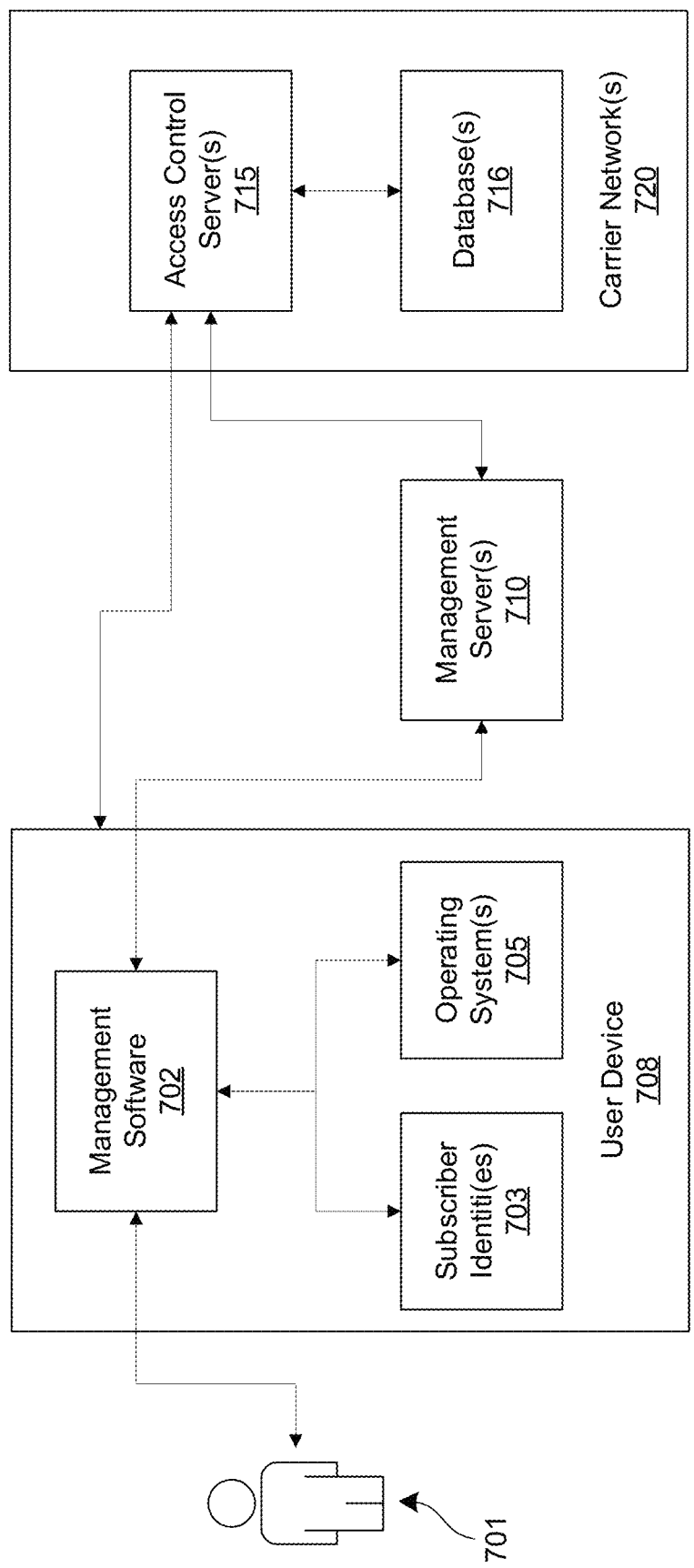
FIG. 7 depicts another illustrative operating environment of subscriber identity management system.

FIG. 7 depicts another illustrative operating environment of subscriber identity management. An illustrative operating environment may comprise a user 701, a user device 708, management software 702 associated with the user device 708, one or more subscriber identities 703, one or more operating systems 705, and/or one or more management servers 710. The management software 702 may comprise a mobile device management software running on the user device 708. The operating environment may also comprise a carrier network 720, and the network 720 may comprise an access control server 715 and/or a database 716.

The management software 302 of FIG. 3 may correspond to the management software 702 of FIG. 7, the subscriber identity 303 may correspond to the subscriber identity 703, the user device 308 may correspond to the user device 708, and the server 310 may correspond to the management server 710. As shown in FIG. 7, the carrier network 720 may comprise the access control server 715 which regulates access to the carrier network 720 from the user device 708 and/or the management server 710. The carrier network 720 may comprise the database 716. The carrier network 720 may be authorized to read, write, erase or retrieve information from the database 716. The user device 708 may comprise an operating system 705, which may correspond to the operating system 123 of FIG. 1 or the operating system 217 of FIG. 2.

The management server 710 may mediate one or more interplays between the user device 708 and the carrier network 720. For example, the user device 708 may send one or more identities associated with the user 701, the user device 708 and/or the subscriber identity 703 to the management server 710. The management server 710 may send the identities to the access control server 715. The management server 710 may also receive a request to enroll the user device 708 to the management server 710, and enroll the user device 708 to the management server 710. The management server 710 may comprise a mobile device management server.

The carrier network 720 may comprise network infrastructure belonging to a telecommunications service provider such as VERIZON, AT&T, SPRINT, etc. The carrier network 720 may comprise large and complex configurations of hardware, interconnected to provide communications services to users spread over large geographic areas.

The carrier network 720 may comprise the access control server 715 (e.g., the data server 103 or the web server 105 of FIG. 1 or the computing device 201 or the server 206 of FIG. 2) and the database 716 (e.g., the RAM 113, the ROM 115, the memory 121 or the databases 129, 131 of FIG. 1 or the RAM 205, the ROM 207, the memory 215 or the associated database 221 of FIG. 2). The access control server 715 may comprise an access control component of the carrier network 720. The user device 708 may directly communicate with the access control server 715. The database 716 may comprise a key store or key chain to securely store cryptographic keys or certificates. The database 716 may be regulated by the access control server 715. The database 716 may be associated with the user device 708, and located in the user device 708. The database 716 may also be associated with the management server 710, and located in the management server 710.

Though not shown in FIG. 7, each of the user device 708, the management server 710, and the access control server 715 may comprise a computer processor (e.g., the processor 111 or the control logic 125 of FIG. 1 or the processor 203 of FIG. 2) and/or memory (e.g., the RAM 113, the ROM 115, the memory 121 or the databases 129 or 131 of FIG. 1 or the RAM 205, the ROM 207, the memory 215, or the associated database 221 of FIG. 2). Each of the user device 708, the management server 710, and the access control server 715 may correspond to the data server 103 of FIG. 1 or the computing device 201 of FIG. 2.

As previously described, if the subscriber identity 703 (e.g., a SIM) associated with the user device 708 is lost or hacked, the subscriber identity 703 may be used with another device by unauthorized users. Example systems, processes, or methods of protecting the subscriber identity 703 from unauthorized uses will be described in further detail with reference to FIGS. 8 to 10.

Figure 8:
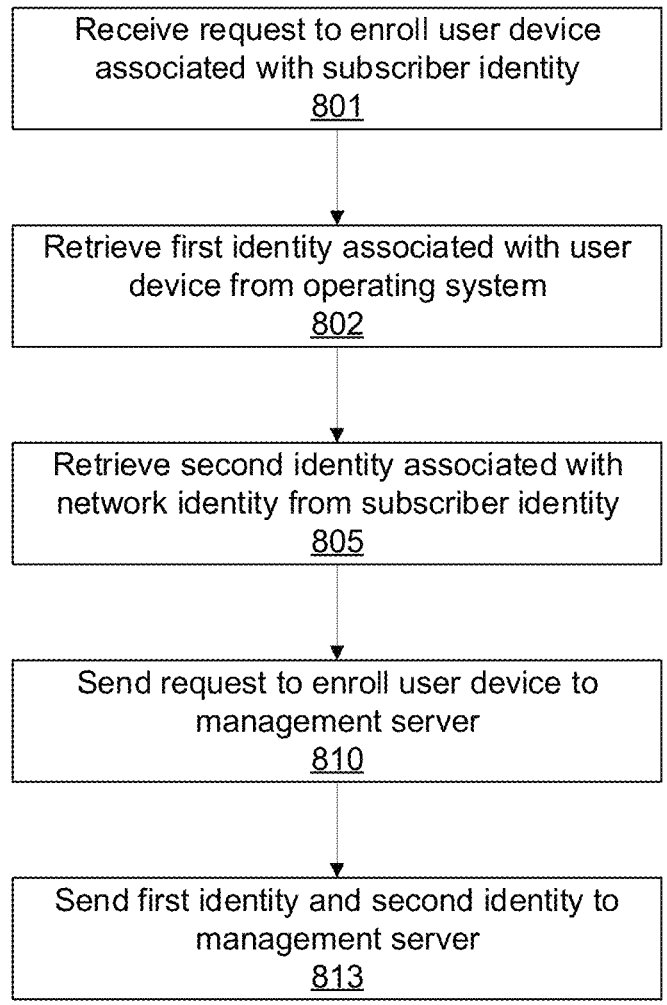
FIG. 8 depicts another illustrative flow chart showing example methods for a management software associated with a user device to register one or more identities associated with a user, the user device and/or a subscriber identity associated with the user device with a carrier network.

FIG. 8 depicts an illustrative flow chart showing example methods for the management software 702 to register one or more identities associated with the user 701, the user device 708 and/or the subscriber identity 703 with the carrier network 720. In FIG. 8, at step 801, the management software 702 may receive a request to enroll the user device 708 associated with the subscriber identity 703. The request to enroll the user device 708 may be accepted with or without a local password verified by the management software 702.

At step 802, the management software 702 may retrieve a first identity associated with the user device 708 from the operating system 705. For network security, it may be advantageous to verify multiple identities associated with the user 701, the user device 708 and/or the subscriber identity 703, when the user device 708 attempts to gain access to the carrier network 702. Examples of the identities may include an IMSI, an International Mobile Equipment Identity (IMEI), an ICCID, an Authentication Key ($K_i$), a Local Area Identity (LAI), an Operator-Specific Emergency Number, etc. The management software 702 may send a request for the first identity to the operating system 705, and the operating system 705 may retrieve and/or send the first identity to the management software 702. The management software 702 may retrieve the first identity from the operating system 605 by calling a system API or protocol. The first identity may comprise, e.g., an IMEI. The retrieved first identity may be temporarily stored within memory of the user device 608 or an external server.

At step 805, the management software 702 may retrieve a second identity associated with a user network identity from the subscriber identity 703. The management software 702 may send a request for the second identity to the subscriber identity 703, and the subscriber identity 703 may retrieve and/or send the second identity to the management software 702. Steps 802 & 805 may be performed in parallel or interchangeably. Steps 802 & 805 may be performed after the user device 708 is enrolled to the management server 710 (e.g. in step 801). The second identity may comprise, e.g., an IMSI. The management software 702 may retrieve the second identity, by calling a system API or protocol. The second identity may be temporarily stored within memory of the user device 608 or an external server. The retrieved first and second identities (e.g., in steps 802 & 805) may be used to verify or authenticate the user device 708 by the access control server 715.

At step 810, the management software 702 may send a request to enroll the user device 708 to the management server 710. If the user device 708 is enrolled to the management server 710, the user device 708 may send identities associated with the user device 708 to the access control server 715 associated with the carrier network 720. The management server 710 may mediate communications between the user device 708 and the carrier network 720. As previously described, the user device 708 may send one or more identities associated with the user device 708 to the management server 710. The management server 710 may send the one or more identities to the access control server 715 associated with the carrier network 720. The management server 710 may deny access to the carrier network 720 from the user device 708. The management server 710 may comprise a mobile device management server. The management server 710 may be included in the carrier network 720.

At step 813, the management software 702 may send the first identity (retrieved, e.g., in step 802) and the second identity (retrieved, e.g., in step 805) to the management server 710. The management server 710 may send the first identity and the second identity to the access control server 715. In some examples, the management software 702 may send multiple number of identities associated with the user 701, the user device 708 and/or the subscriber identity 703 to the management server 710 or the access control server 715.

Figure 9:
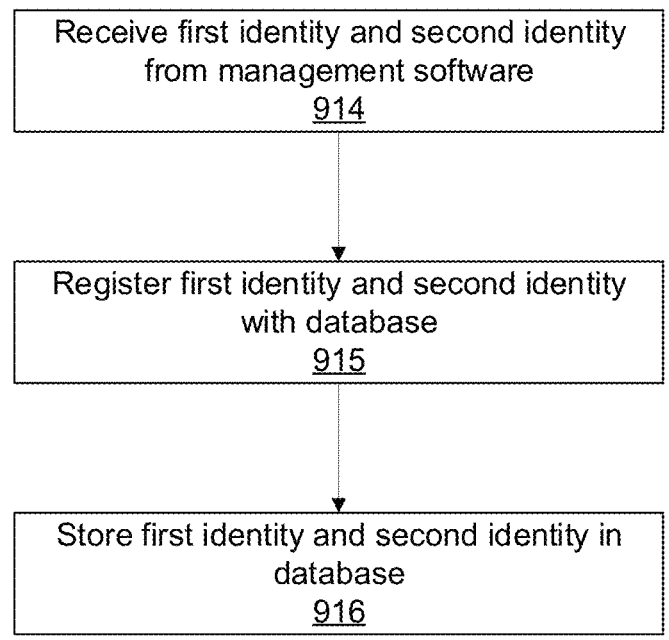
FIG. 9 depicts another illustrative flow chart showing example methods for a server to register one or more identities associated with a user, the user device and/or a subscriber identity associated with the user device with a carrier network.

FIG. 9 depicts an illustrative flow chart showing example methods for the access control server 715 to register one or more identities associated with the user 701, the user device 708 and/or the subscriber identity 703 with the carrier network 720. In FIG. 9, at step 914, the access control server 715 may receive the first identity and the second identity from the management server 710 (sent from the management server 710, e.g., in step 813 of FIG. 8). The request to register the first identity and second identity to the carrier network 720 may be automatically sent to the management server 710, e.g., without a request from the user 701. At step 715, the access control server 715 may register the first identity and the second identity with the database 716 associated with the carrier network 720. At step 716, the access control server 715 may securely store the first identity and the second identity in the database 716, such as in a key store or key chain.

Figure 10:
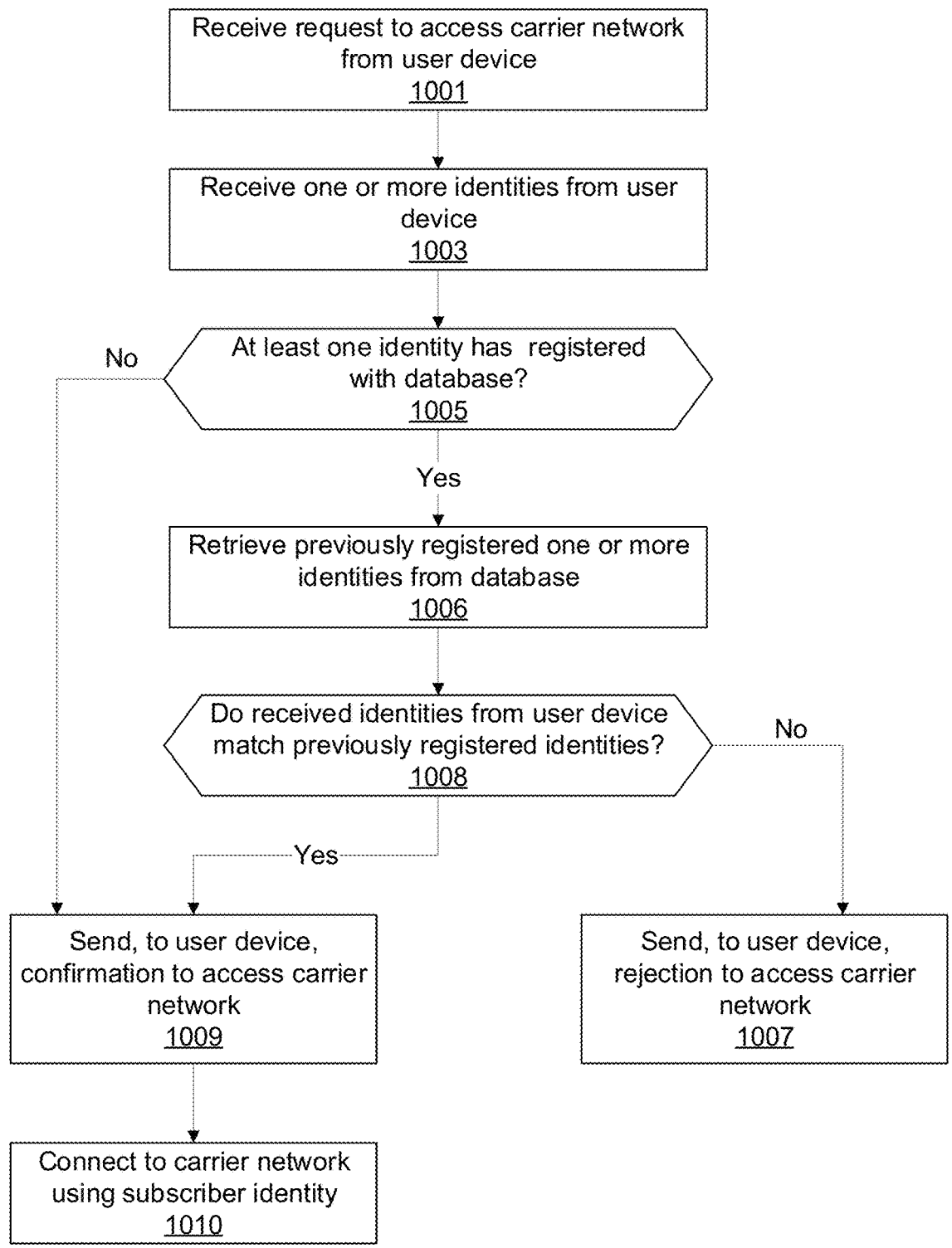
FIG. 10 depicts another illustrative flow chart showing example methods of verifying one or more identities associated with a user, a user device and/or a subscriber identity associated with the user device, and connecting the user device to a carrier network.

FIG. 10 depicts an illustrative flow chart showing example methods of verifying one or more identities associated with the user 701, the user device 708 and/or the subscriber identity 703, and connecting the user device 708 to the carrier network 720. In FIG. 10, at step 1001, the access control server 715 may receive, from the user device 708 or the management server 710, a request to access the carrier network 720. The access control server 715 may comprise, e.g., a Home Subscriber Server (HSS) in the LTE networks. At step 1003, the access control server 715 may receive, from the user device 708 or the management server 710, one or more identities associated with the user 701, the subscriber identity 703, and/or the user device 708. As previously described, the management server 710 may receive the one or more identities (e.g., in step 813 of FIG. 8), and send the one or more identities to the access control server 715.

At step 1005, the access control server 715 may determine whether at least one identity has been registered with the database 716. If no identity has been registered (step 1005: no), the access control server 715 may proceed to step 1009 and send, to the user device 708, a confirmation indicating that access to the carrier network 720 is granted. If no identity associated with user devices has been previously registered with the database 716, the user might not be using the registration system. In that case, the user may be given access to the carrier network 720 because they might not be using the subscriber identity management system described herein. If at least one identity has been registered with the database 716 (step 1005: yes), the access control server 715 may proceed to step 1006.

At step 1006, the access control server 715 may retrieve the one or more identities previously registered with the database 716 (e.g., in step 915 of FIG. 9). At step 1008, the access control server 615 may determine whether the one or more identities received from the user device 708 (e.g., in step 1003) match with the previously registered one or more identities (e.g., in step 1006). If not matched (step 1008: no), at step 1007, the access control server 715 may send, to the user device 708, a message indicating that access to the carrier network 720 has been rejected. If matched (step 1008: yes), at step 1009, the access control server 715 may send, to the user device 708, a confirmation indicating that the user device 708 is granted access to the carrier network 720.

At step 1010, the user device 708 may be connected to the carrier network 720 using the subscriber identity 703 (e.g., by using the user account information and/or network-specific information contained in the subscriber identity 703). As previously described, if the carrier network 720 succeeds in verifying one or more identities associated with the user device 708 and authenticating the subscriber identity 703, the user device 708 may be connected to the carrier network 720.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   locking, using a first password for locking and unlocking a subscriber identity associated with a user device, the subscriber identity, wherein the locking prevents the user device from accessing a network associated with the subscriber identity,
   receiving user input indicative of a second password that is associated with the user device, wherein the second password is different from the first password;
   as a response to verifying the second password, unlocking, using the first password, the subscriber identity; and
   causing a connection to the network to be established based on the unlock and using the subscriber identity.

2. The method of claim 1, wherein the first password comprises a personal identification number (PIN).

3. The method of claim 1, wherein locking the subscriber identity is performed based on setting a first copy of the first password onto the subscriber identity;
   wherein the method further comprises storing a second copy of the first password in a key store associated with management software executed by the user device; and
   wherein unlocking the subscriber identity is performed based on retrieving the second copy of the first password from the key store and matching the second copy of the first password to the first copy of the first password.

4. The method of claim 1, wherein locking the subscriber identity is performed without a user of the user device being notified of the locking.

5. The method of claim 1, wherein locking the subscriber identity is performed without a user of the user device requesting the locking.

6. The method of claim 1, further comprising:
   sending, to a server, a request for the first password without receiving user input indicating the request is to be sent; and receiving, from the server, the first password, wherein the first password comprises a randomized number generated by the server.

7. The method of claim 1, wherein locking the subscriber identity is performed based on management software, automatically and without input from a user, causing the subscriber identity to be locked;
wherein unlocking the subscriber identity is performed based on the management software, automatically and without input from the user, causing the subscriber identity to be unlocked; and wherein the second password is associated with a sign-on process with the management software.

8. The method of claim 1, wherein the subscriber identity comprises a subscriber identity module (SIM) that is configured to enable access to a cellular network, and wherein the network comprises the cellular network.

9. An apparatus comprising:
one or more processors; and
memory storing executable instructions that, when executed by the one or more processors, cause the apparatus to:
receive, from a server, a first password for locking and unlocking a subscriber identity associated with the apparatus,
lock, using the first password, the subscriber identity, wherein the lock prevents the apparatus from accessing a network associated with the subscriber identity,
receive user input indicative of a second password that is associated with the apparatus, wherein the second password is different from the first password,
as a response to verifying the second password, unlock, using the first password, the subscriber identity, and
cause a connection to the network to be established based on the unlock and using the subscriber identity.

10. The apparatus of claim 9, wherein the first password comprises a personal identification number (PIN).

11. The apparatus of claim 9, wherein the executable instructions, when executed by the one or more processors, cause the apparatus to perform the lock of the subscriber identity based on a call to an application program interface, of an operating system, that locks the subscriber identity.

12. The apparatus of claim 9, wherein the executable instructions, when executed by the one or more processors, cause the apparatus to:
perform the lock of the subscriber identity based on setting a first copy of the first password onto the subscriber identity,
store a second copy of the first password in a key store associated with management software executed by the apparatus, and
perform the unlock of the subscriber identity based on retrieving the second copy of the first password from the key store and matching the second copy of the first password to the first copy of the first password.

13. The apparatus of claim 9, wherein the executable instructions, when executed by the one or more processors, cause the apparatus to perform the lock of the subscriber identity without a user of the apparatus being notified of the lock.

14. The apparatus of claim 9, wherein the executable instructions, when executed by the one or more processors, cause the apparatus to perform the lock of the subscriber identity without a user of the apparatus requesting the lock.

15. The apparatus of claim 9, wherein the executable instructions, when executed by the one or more processors, cause the apparatus to send, to the server, a request for the first password without receiving user input indicating the request is to be sent; and
wherein the server is further configured to, based on the request, generate the first password using a random number generator.

16. The apparatus of claim 9, wherein the executable instructions, when executed by the one or more processors, cause the apparatus to:
perform the lock of the subscriber identity based on management software, automatically and without input from a user, causing the subscriber identity to be locked, and
perform the unlock of the subscriber identity based on the management software, automatically and without input from the user, causing the subscriber identity to be unlocked, wherein the second password is associated with a sign-on process with the management software.

17. The apparatus of claim 9, wherein the subscriber identity comprises a subscriber identity module (SIM) that is configured to enable access to a cellular network, and wherein the network comprises the cellular network.

18. A method comprising:
receiving, by a client device and from a remote computing device, an identifier that is associated with a user of the client device, wherein the client device is in communication with a subscriber identity module (SIM) card;
configuring, by the client device, the SIM card with use of the received identifier so as to lock the SIM card and prevent access to a communications network by the client device using the SIM card;
storing, by the client device, the received identifier in memory of the client device to enable the client device to unlock the SIM card; and
unlocking, by the client device, the SIM card using the received identifier that is retrieved from the memory of the client device in response to an input received by the client device, so as to enable the client device to access the communications network with use of the SIM card.

19. The method of claim 18, wherein the identifier includes a personal identification number (PIN) associated with the user, and wherein the input indicates a password different from the PIN.

20. The method of claim 18, wherein the configuring of the SIM card is performed without the user requesting the lock and without the user being notified of the lock, and wherein the unlocking of the SIM card is performed without the user requesting the unlocking and without the user being notified of the unlocking.

* * * * *